March 17, 1931.  T. J. FREE  1,796,780
WEED PULLER
Filed June 30, 1928
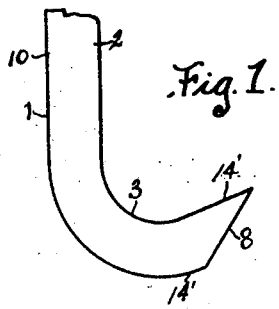
Fig. 1.
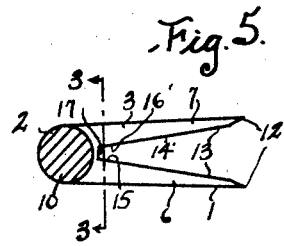
Fig. 5.
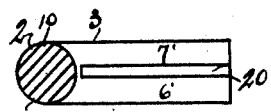
Fig. 2.
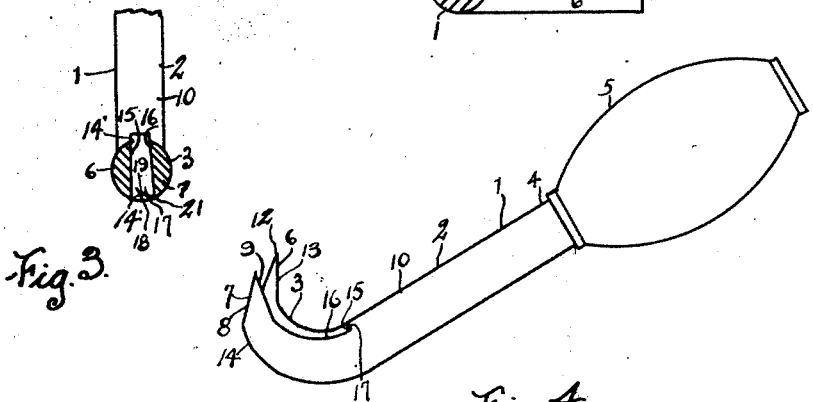
Fig. 3.
Fig. 4.
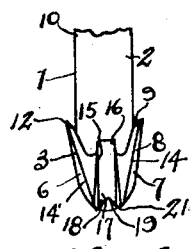
Fig. 6.
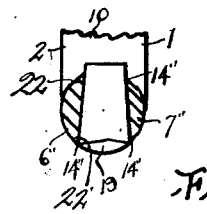
Fig. 7.
INVENTOR.
Thomas Jefferson Free
BY
Leo A. Parker.
ATTORNEY.

Patented Mar. 17, 1931

1,796,780

UNITED STATES PATENT OFFICE

THOMAS JEFFERSON FREE, OF COVINGTON, KENTUCKY

WEED PULLER

Application filed June 30, 1928. Serial No. 289,447.

The invention relates to an implement for use in a garden or lawn and particularly adapted for utilization in removing weeds therefrom.

The objects of the invention are to provide a simple, efficient, and durable device adapted for manual use in quickly and conveniently removing weeds from the earth, and to provide a method by which said tool may be economically manufactured.

The invention consists in the combination of the parts, arrangement of the elements, and in the details of the construction, as claimed.

In the drawings:

Fig. 1 is a side elevation of the invention, with parts broken away, showing the side elevation of the curved lower end;

Fig. 2 is a horizontal section showing the invention in the first stages of its manufacture;

Fig. 3 is a section taken on a line corresponding to 3—3 in Fig. 5;

Fig. 4 is a perspective view of the invention;

Fig. 5 is a horizontal section and showing the invention in its completed form;

Fig. 6 is a side elevation of the invention, with parts broken away, showing an end elevation of the curved lower end; and Fig. 7 is a section taken on a line corresponding to 3—3 in Fig. 5, and showing a modification of the invention.

In the preferred construction of the weed puller 1, I provide the cylindrical rod 2 having the curved lower end 3. To the upper end 4, of the rod, is suitably fixed the hand contact handle 5.

Integral with the curved lower end 3, of the rod, are the diverging fingers 6 and 7. The outer lower edge 8, of each finger is tapered downwardly, and the outer inner surface 9, is tapered inwardly, whereby the outer end of each finger, which extends upwardly at an angle to the body 10, of the rod 2, terminates into the point 12. The top 13, and bottom 14 of each finger tapers to the knife edge 14'.

The inner inner surfaces 15 and 16 of the fingers 6 and 7, adjacent the body 10 of the rod, diverge downwardly, whereby the groove 17 intermediate the fingers 6 and 7, is widest at its lower portion 18. The surfaces 15 and 16 of the fingers form the walls of the groove 17. In the lower end 3 of the rod 2 is the groove 19 which terminates into the groove 17, which is substantially at right angles to the groove 19.

The method of making the weed puller 1 consists in first curving the lower end 3 of the rod 2 in the form shown in Fig. 1. Then the slot 20, shown in Fig. 2 is sawed in the end 3, in a plane with the curve therein, whereby the parallel fingers 6' and 7' are formed. Then the outer lower edge 8 of each finger is tapered downwardly. Then the outer ends of the fingers are forced outwardly and the outer inner surface 9 of each finger is tapered inwardly, by means of a file, or other suitable device, whereby the point 12 is formed at the end of each finger. Then the inner inner surfaces 15 and 16 of the fingers are tapered downwardly and outwardly. Then the groove 19 is filed into the lower end of the rod. Then the handle 5 is suitably fixed to the upper end 4 of the rod 2.

In operation the lower end 3 of the tool 1 is inserted beneath the ground and the tool is manipulated so that the weed to be pulled is positioned intermediate the fingers 6 and 7 and in the groove 17. Then the handle 5 is manually forced upwardly causing the points 12 of the fingers to move upwardly thereby pulling the weed from the ground. The weed is retained securely in the groove 17, since the lower portion of the groove 17 is wider than its upper portion.

The groove 19 formed in the lower end 3 of the rod and shown in Fig. 6, results in the sharp edges 21 being on the lower end 3 of the tool, whereby the tool may be readily inserted into the ground, under circumstances where it is undesirable to insert the pointed ends 12 of the fingers previously to insertion of the curved portion of the tool, in anticipation of pulling a weed.

In Fig. 7 is shown a modification of the invention in which the upper and lower edges of the fingers 6'' and 7'' have been filed forming the knife edges 14'' at their top 22 and bottom 22'.

An advantage of the invention is that the tool 1 is relatively light of weight and it may be manufactured economically by hand labor, as well as by utilization of machinery.

Another advantage of the invention is that the peculiar form of the tool facilitates in its being readily inserted deep into the ground and into the roots of deep-rooted weeds.

Still another advantage of the invention is that the tops of the fingers 6 and 7 are sharp, and therefore, are adapted to become embedded into the sides of the weed being pulled, whereby the stem of the weed is securely retained intermediate the fingers during the extraction operation.

It is, therefore, apparent that I have invented a highly desirable device of the character described which is adapted for manual use in efficiently pulling weeds from various depths in the ground.

I have chosen to illustrate the forms and constructions of the invention by the herein drawings and explanations of the same. Yet, I desire to emphasize that it is my intention that the invention resides in the combination, arrangement of the parts and in the details of the construction, as claimed. In other words, it is understood that changes and modifications in the embodiment of the invention, such as its size, the materials used, and the like, as disclosed herein, can be made within the scope of what is claimed without departing from the spirit of the invention, as other expedients may readily suggest themselves to persons familiar in the art to which the invention appertains.

What I claim as new and desire to secure by Letters Patent is:

A weed puller comprising a handle, a rod having its upper end fixed to said handle, said rod being curved at its lower end and terminating into diverging fingers, said fingers each tapering to a point at its end and to a knife edge at its top and bottom.

THOMAS JEFFERSON FREE.